United States Patent
Chang et al.

(10) Patent No.: US 7,822,211 B2
(45) Date of Patent: Oct. 26, 2010

(54) STEREO DECODING SYSTEM CAPABLE OF REDUCING THE PHASE SHIFT DURING THE SIGNAL TRANSFORMING

(75) Inventors: Hsiang-Hui Chang, Taipei Hsien (TW); Chih-Chien Huang, Yunlin Hsien (TW); Chieh Hung Chen, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 1140 days.

(21) Appl. No.: 11/456,999

(22) Filed: Jul. 12, 2006

(65) Prior Publication Data
US 2008/0013743 A1    Jan. 17, 2008

(51) Int. Cl.
    *H04H 20/48*   (2008.01)
(52) U.S. Cl. .................. 381/3; 381/2; 455/255; 455/260
(58) Field of Classification Search ............. 381/1–3, 381/14, 16; 455/255, 260
See application file for complete search history.

(56) References Cited

U.S. PATENT DOCUMENTS

| | | | |
|---|---|---|---|
| 5,202,924 A | | 4/1993 | Richards, Jr. |
| 5,406,631 A | | 4/1995 | Takeda et al. |
| 5,526,284 A | * | 6/1996 | Mankovitz ............... 455/66.1 |
| 5,561,849 A | * | 10/1996 | Mankovitz ................. 455/45 |
| 6,115,473 A | * | 9/2000 | Takagi ........................ 381/2 |
| 2007/0047737 A1 | * | 3/2007 | Lerner et al. ................ 381/22 |
| 2007/0223707 A1 | * | 9/2007 | Chen ......................... 381/12 |

FOREIGN PATENT DOCUMENTS

WO    03077435 A1    9/2003

* cited by examiner

*Primary Examiner*—Devona E Faulk
*Assistant Examiner*—Disler Paul
(74) *Attorney, Agent, or Firm*—Thomas, Kayden, Horstemeyer & Risley

(57) ABSTRACT

A stereo decoding system comprises an oscillator, a bandpass filter, a PLL unit and a stereo decoder. The oscillator generates a first signal with a center frequency. The bandpass filter receives a stereo multiplexed signal and the first signal to filter out a pilot signal. The PLL unit receives the pilot signal to generate a PLL output signal. The stereo decoder receives the stereo multiplexed signal and the PLL output signal to separate a left channel signal and a right channel signal from the stereo multiplexed signal.

28 Claims, 5 Drawing Sheets

STEREO DECODING SYSTEM CAPABLE OF REDUCING THE PHASE SHIFT DURING THE SIGNAL TRANSFORMING

BACKGROUND

The invention relates to a stereo decoding system, and more particularly to a stereo decoding system capable of reducing phase shift during the signal transformation.

One advantage of FM is the ability to transmit in stereo due to the properties of FM, such as better rejection than AM, and more distance on the dial between FM stations. When a stereo decoding system receives and decodes a stereo signal, the decoding system requires a synchronous signal to separate a left channel signal and a right channel signal from the stereo signal. The separation of the left channel signal and the right channel signal depends on the delay, such as phase delay or frequency delay, between the stereo signal and the synchronous signal. If the delay is too great, the left channel signal and the right channel cannot be clearly separated. It is obvious that a stereo decoding system capable of reducing delays is desirable.

SUMMARY

The invention provides a stereo decoding system capable of reducing phase shift during signal transformation and increasing the separation of the left channel signal and the right channel signal from the stereo multiplexed signal.

In one aspect of the invention, a stereo decoding system comprises an oscillator, a bandpass filter, a PLL unit and a stereo decoder. The oscillator generates a first signal with a center frequency. The bandpass filter receives a stereo multiplexed signal and the first signal to filter out a pilot signal. The PLL unit receives the pilot signal to generate a PLL output signal. The stereo decoder receives the stereo multiplexed signal and the PLL output signal to separate a left channel signal and a right channel signal from the stereo multiplexed signal.

In another aspect of the invention, a stereo decoding system comprises a bandpass filter, a PLL unit and a stereo decoder. The bandpass filter receives a stereo multiplexed signal and a first signal with a center frequency to filter out a pilot signal. The PLL unit receives the pilot signal to generate a PLL output signal and the first signal. The stereo decoder receives the stereo multiplexed signal and the PLL output signal to separate a left channel signal and a right channel signal from the stereo multiplexed signal.

In a further aspect of the invention, an FM decoding chip comprises the FM demodulator and stereo decoding system previously described. The FM demodulator receives and demodulates radio signals to generate stereo multiplexed signals. The stereo decoding system separates left channel signals and right channel signals from the stereo multiplexed signal.

In a further aspect of the invention, the invention discloses a stereo decoding method that comprises the following steps: receiving a stereo multiplexed signal; determining a first signal with a center frequency of a bandpass filter; filtering out a pilot signal from the stereo multiplexed signal by the bandpass filter according to the center frequency; providing a PLL unit to generate a PLL output signal based on the pilot signal; providing a stereo decoder receiving the stereo multiplexed signal and the PLL output signal to separate a left channel signal and a right channel signal from the stereo multiplexed signal.

DETAILED DESCRIPTION

Figure 1:
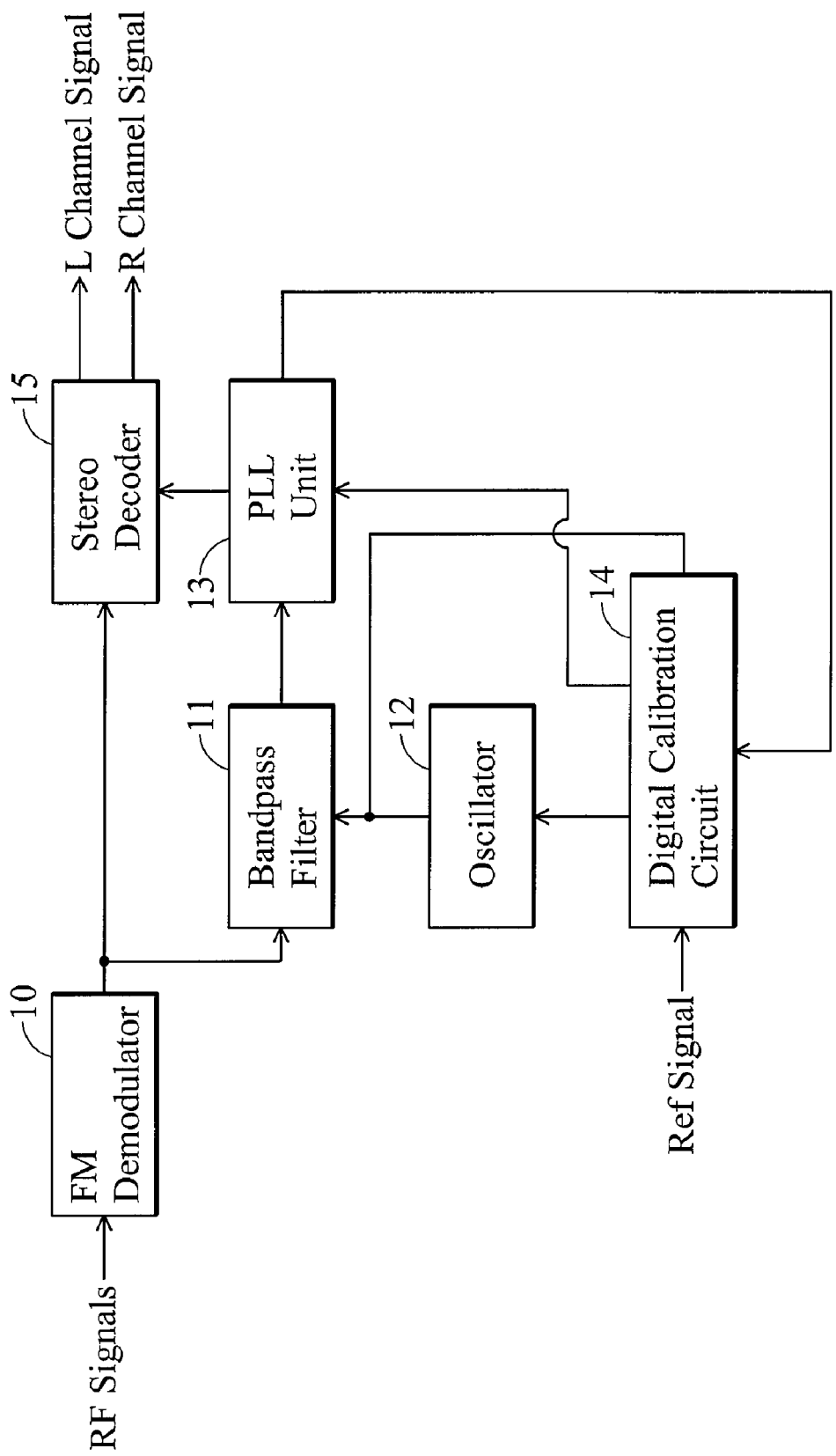
FIG. 1 is a block diagram of an embodiment of a stereo decoding system according to the invention.

The invention can be more fully understood by the subsequent detailed description and examples with reference made to the accompanying drawings, wherein:

FIG. 1 is a block diagram of an embodiment of a stereo decoding system according to the invention. FM demodulator 10 receives and demodulates the RF signals to generate a stereo multiplexed signal that comprises information of a pilot signal, a left channel signal and a right channel signal. Bandpass filter 11 has a center frequency fc and a bandwidth between frequency fa and fb. Oscillator 12 generates and transmits a first signal with a frequency fx between the frequency fa and fb to the bandpass filter 11 to filter out the pilot signal from the stereo multiplexed signal. The oscillator 12 also transmits the first signal to a digital calibration circuit 14 to calibrate the frequency fx to the center frequency fc. Please refer to FIG. 2, a reference signal provides a tuning window, such as tuning window 20, for the digital calibration circuit 14 to calibrate the frequency of the first signal. In the tuning window 20, the digital calibration circuit 14 counts the number of first signal and calibrates the center frequency according to the number thereof. In one aspect of the invention, the center frequency is about 456 KHz and the pilot signal has a frequency about 19 KHz. PLL unit 13 is controlled by the digital calibration circuit 14 and generates a PLL output signal in accordance with the pilot signal and the PLL output signal is locked by the PLL unit 13 with respect to the pilot signal filtered out by the band pass filter 11, wherein in one aspect of the invention, the PLL output signal has a frequency about 38 KHz. The stereo decoder 15 receives and decodes the stereo multiplexed signal to separate a left channel signal and a right channel signal therefrom according to the PLL output signal.

The separation of the left channel signal and right channel signal depends on the phase delay between the PLL output signal and the stereo multiplexed signal. The phase delay is caused by the bandpass filter 11, oscillator 12, PLL unit 13 and the signal transmission, wherein the phase delay caused by the signal transmission is not discussed in the present invention. According to the system simulated results, the total phase delay of the bandpass filter 11, oscillator 12 and the PLL unit 13 should be less than 1 µs to achieve that the separation is lower than 30db, the low threshold of the separation. The PLL unit 13 can lock the phase between the pilot signal and PLL output signal, thus, in this case, the phase delay between the pilot signal and the PLL output signal is ignored. According to the simulation of the stereo decoding system of FIG. 1, the bandpass filter generates 0.6 µs phase delay per 1 KHz shift of the center frequency. Although the digital calibration circuit 14 can calibrate the frequency fx close to the center frequency fc, inaccuracy of frequency still exists. If the inaccuracy of frequency is larger than 2 KHz, the separation is not good enough for the stereo decoding system.

Figure 3:
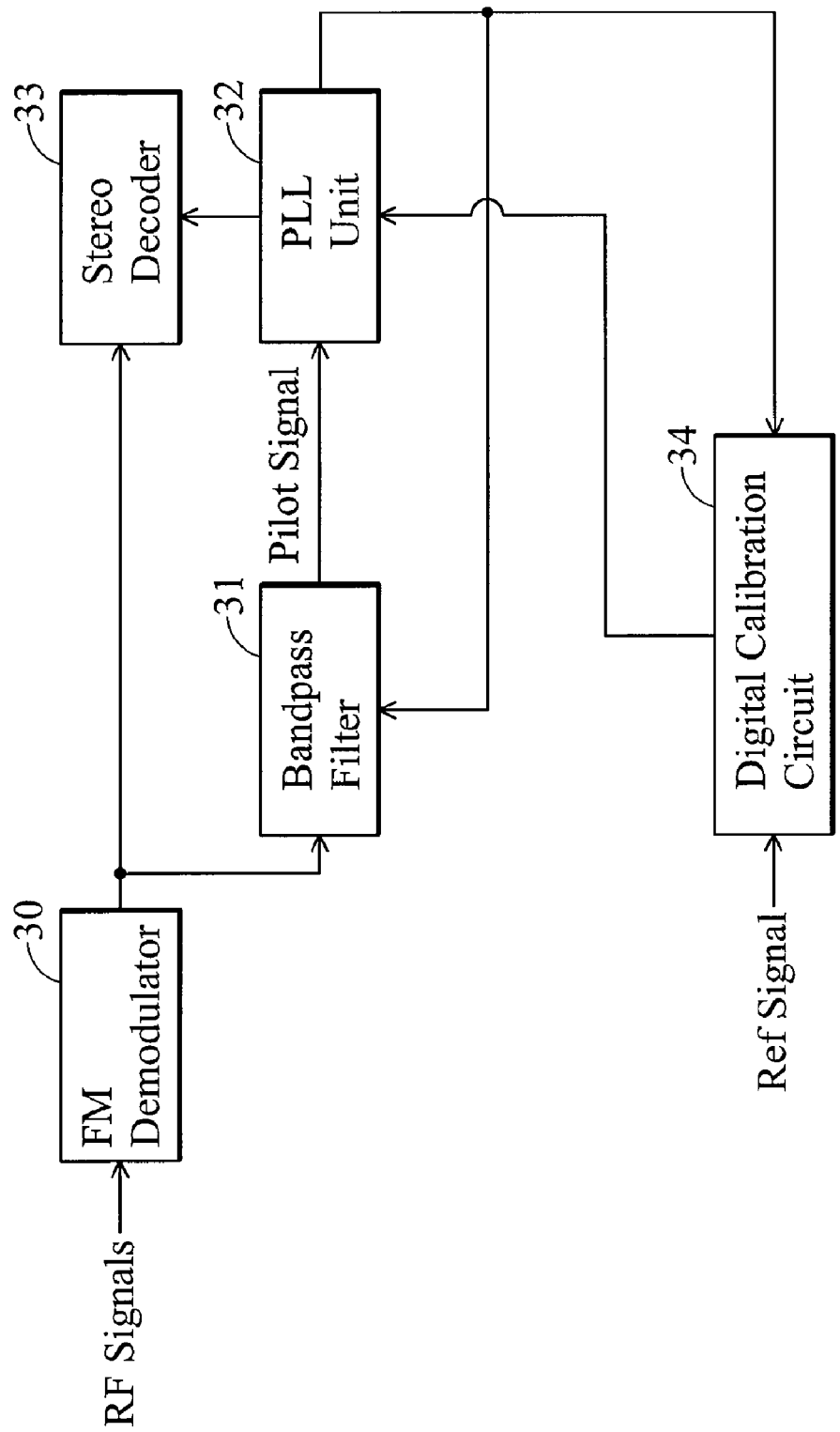
FIG. 3 is a block diagram of an embodiment of another stereo decoding system according to the invention.

To reduce the inaccuracy of frequency, the invention further discloses another embodiment of the stereo decoding system. Please refer to FIG. 3. FIG. 3 is a block diagram of an embodiment of another stereo decoding system according to the invention. FM demodulator 30 receives and demodulates the RF signals to generate a stereo multiplexed signal that comprises information of a pilot signal, a left channel signal and a right channel signal. Bandpass filter 31 has a center frequency fc and a bandwidth between frequency fa and fb. PLL units 32 generates and transmits the first signal with a frequency fx between fa and fb to the bandpass filter 31 to filter out the pilot signal from stereo multiplexed signal. The PLL unit 32 receives the pilot signal and the frequency of the first signal is calibrated by the digital calibration circuit 34 according to the frequency of pilot signal, wherein the calibration method of the digital calibration circuit 34 is the same as the calibration method of the digital calibration circuit 14. In FIG. 3 the bandpass filter 31 and the PLL unit 32 forms a close loop, thus, when the close loop is locked, the frequency fx generated by the PLL unit 32 can be equal to the center frequency fc. The PLL unit 32 further generates and transmits a PLL output signal in accordance with the pilot signal to a stereo decoder 33, wherein the PLL output signal is locked by the PLL unit 32 with respect to the pilot signal filtered out by the band pass filter 31. The stereo decoder 33 receives and decodes the stereo multiplexed signal to separate a left channel signal and a right channel signal therefrom according to the PLL output signal. In one aspect of the invention, the pilot signal has a frequency fp about 19 KHz and the center frequency fc and the frequency fp is an integer multiple of the frequency fp, wherein the fc is about 456 KHz and fs is about 38 KHz.

Figure 2:
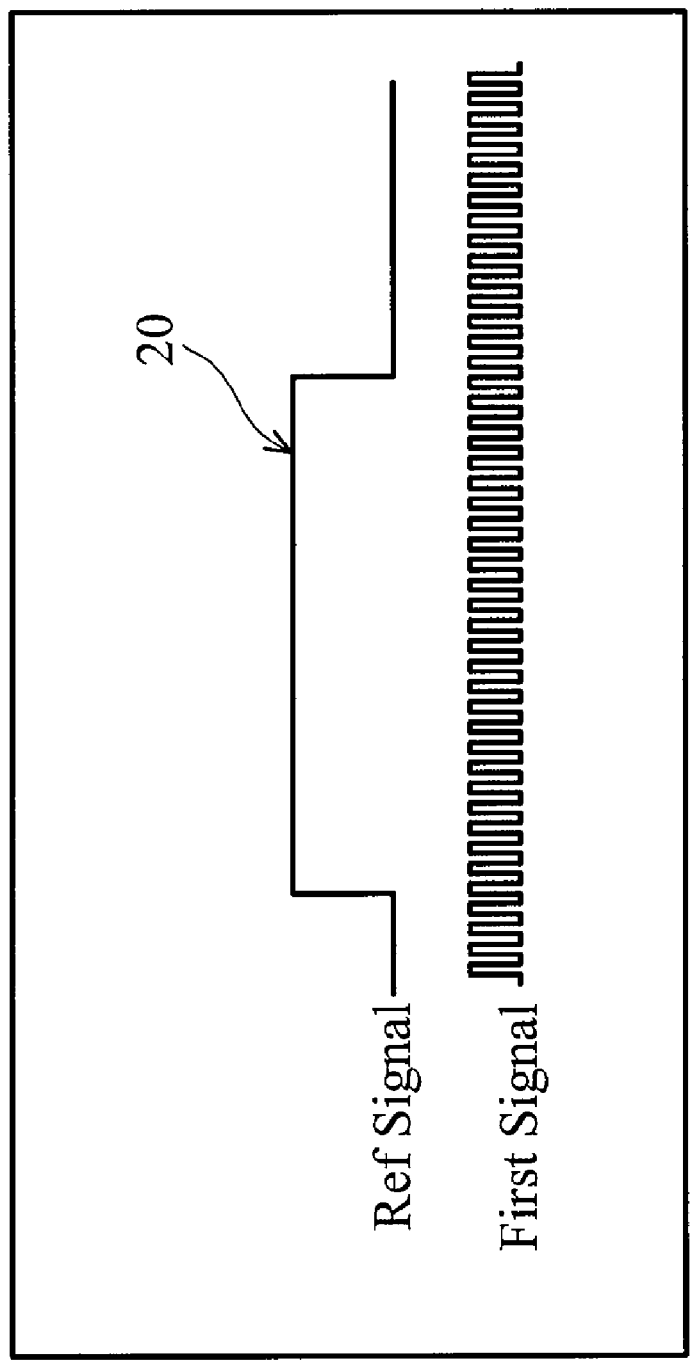
FIG. 2 is a schematic diagram of a frequency calibration method.

Compared with the stereo decoding system of FIG. 2 and FIG. 3, the system of FIG. 3 reduces the cost of oscillator 12 and the inaccuracy of frequency is eliminated.

Figure 4:
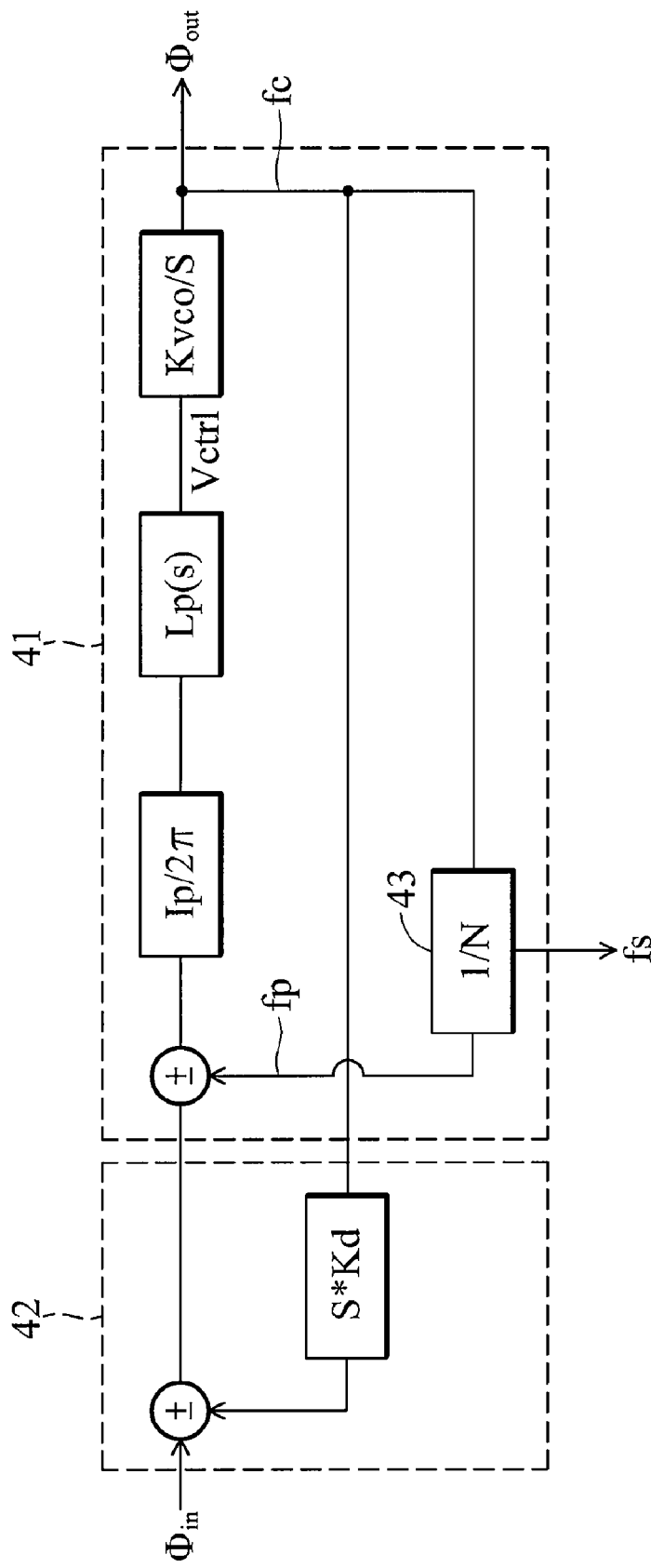
FIG. 4 is a schematic diagram of a small signal model of an embodiment of the bandpass filter and PLL unit of FIG. 3.

FIG. 4 is a schematic diagram of a small signal model of an embodiment of the bandpass filter and PLL unit of FIG. 3. Ip is a charge pump current of the PLL unit 42. Lp(s) is a loop filter transfer function, of the PLL unit 42. Kvco is a frequency gain of voltage controlled oscillator, VCO, which is controlled by a voltage Vctrl to output a desired frequency, such as the center frequency fc. N is a divided value of a divider 43, wherein in the embodiment of FIG. 3, the divider 43 outputs the pilot signal when N is equal to 24 and the PLL output signal when N is equal to 12. Kd is a delay gain of bandpass filter 42. In FIG. 4, take $$Lp(s) = \frac{1+sRC}{sC}$$

for example, thus, the transfer function of $\phi$in and $\phi$tout is shown in the following:

$$\frac{\phi out}{\phi in} = \frac{\frac{Ip}{2\pi} \times (1+sRC) \times \frac{Kvco}{C}}{s^2 \times \left[1 + \frac{Ip}{2\pi} R \times Kvco \times Kd\right] + s\left[\frac{Ip}{2\pi} R \times \frac{Kvco}{N} + \frac{Ip}{2} \frac{Kvco}{C} Kd\right] + \frac{Ip}{2\pi} \frac{1}{C} \frac{Kvco}{N}},$$

wherein the $\omega_n$ and $\epsilon$ is:

$$\omega_n = \sqrt{\frac{\frac{Ip}{2\pi} \frac{1}{C} \frac{Kvco}{N}}{1 + \frac{Ip}{2\pi} R \times Kvco \times Kd}}$$

$$\varepsilon = \frac{\frac{Ip}{2\pi} Kvco\left[\frac{R}{N} + \frac{Kd}{C}\right]}{2\omega_n} \times \frac{1}{1 + \frac{Ip}{2\pi} R \times Kvco \times Kd}$$

In this model, the delay only occurs in the bandpass filter 42, Kd.

Figure 5:
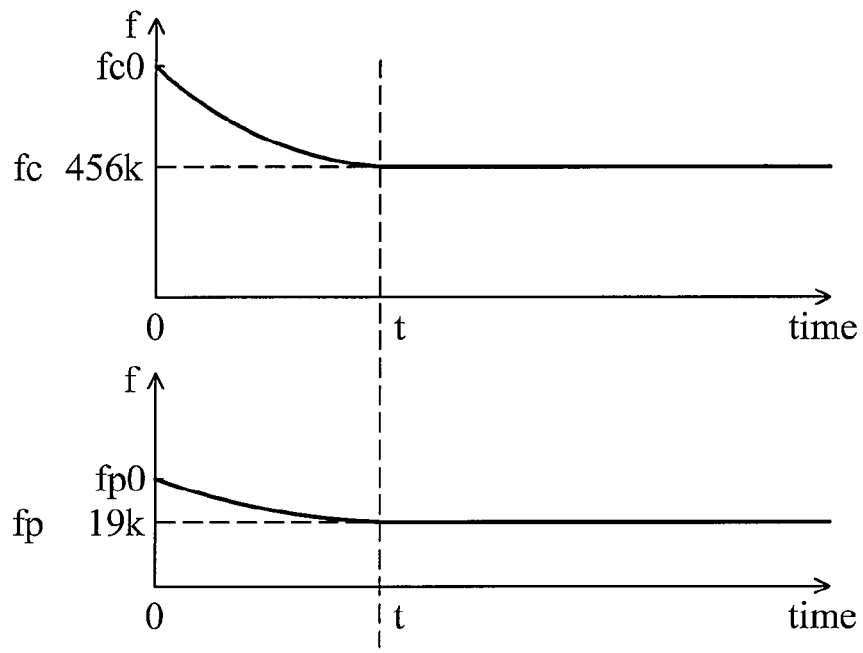
FIG. 5 is a schematic diagram of variation of the frequency fc and fp according to the small signal model of stereo decoding system of FIG. 4.

FIG. 5 is a schematic diagram of variation of the frequency fc and fp according to the small signal model of stereo decoding system of FIG. 4. Frequency fc and fp damps from initial frequencies $fc_0$ and $fp_0$ to stable frequencies 456 k and 19 k Hz at time t due to the negative feedback loop formed by the bandpass filter 31 and PLL unit 32.

Figure 6:
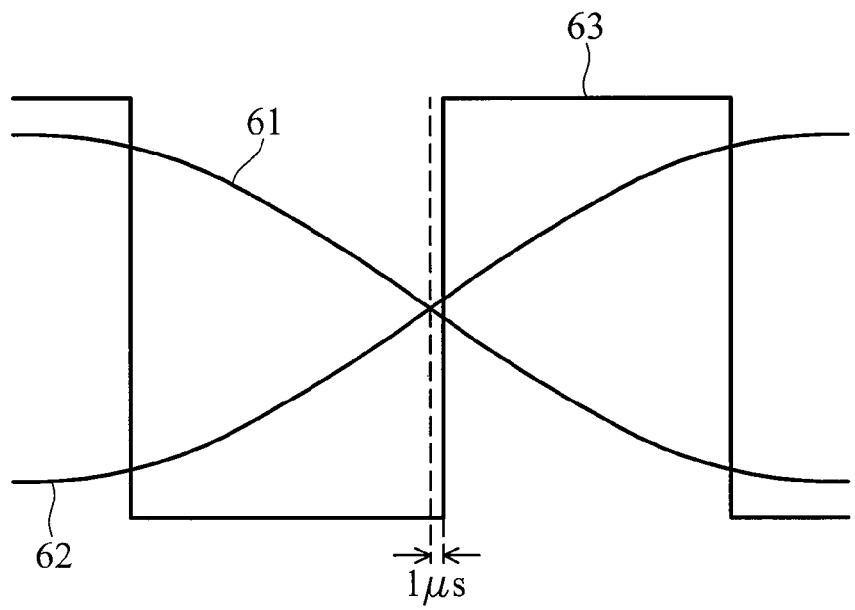
FIG. 6 is a schematic diagram of the phase delay according to the embodiment of stereo decoding system of FIG. 3.

FIG. 6 is a schematic diagram of the phase delay according to this embodiment of stereo decoding system of FIG. 3. Pilot-positive signal 61 and pilot-negative signal 62 constitutes a differential pilot signal and are generated concurrently. When the negative feedback loop formed by the bandpass filter 31 and PLL unit 32 becomes stable after time t, the phase delay between the pilot signal and the PLL output signal 63 is less than 1 us.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stereo decoding system, comprising:
   an oscillator generating a first signal with a center frequency;
   a bandpass filter receiving a stereo multiplexed signal and the first signal to filter out a pilot signal;
   a PLL unit receiving the pilot signal to generate a PLL output signal, wherein the PLL output signal is locked by the PLL unit with respect to the pilot signal; and
   a stereo decoder receiving the stereo multiplexed signal and the PLL output signal to separate a L channel signal and a R channel signal from the stereo multiplexed signal.

2. The stereo decoding system as claimed in claim 1, further comprising a calibration circuit to calibrate the center frequency.

3. The stereo decoding system as claimed in claim 2, wherein the calibration circuit receives a reference signal comprising a tuning window and calibrates the center frequency according to number of clock cycles of the first signal in the tuning window.

4. The stereo decoding system as claimed in claim 1, wherein the stereo multiplexed signal comprises the pilot signal, the L channel signal and the R channel signal.

5. The stereo decoding system as claimed in claim 1, wherein the center frequency is an integer multiple of the frequency of the pilot signal.

6. The stereo decoding system as claimed in claim 1, wherein the stereo multiplexed signal is received from an FM demodulator.

7. The stereo decoding system as claimed in claim 1, wherein the pilot signal has a frequency of about 19 KHz.

8. The stereo decoding system as claimed in claim 1, wherein the PLL output signal has a frequency of about 38 KHz.

9. The stereo decoding system as claimed in claim 1, wherein the center frequency has a frequency of about 456 KHz.

10. A stereo decoding system, comprising:
   a bandpass filter receiving a stereo multiplexed signal and a first signal with a center frequency to filter out a pilot signal;
   a PLL unit receiving the pilot signal to generate a PLL output signal and the first signal, wherein the PLL output signal is locked by the PLL unit with respect to the pilot signal; and
   a stereo decoder receiving the stereo multiplexed signal and the PLL output signal to separate a left channel signal and a right channel signal from the stereo multiplexed signal.

11. The stereo decoding system as claimed in claim 10, wherein the stereo multiplexed signal is received from an FM demodulator.

12. The stereo decoding system as claimed in claim 10, further comprising a calibration circuit to calibrate the center frequency.

13. The stereo decoding system as claimed in claim 10, wherein the stereo multiplexed signal comprises information of the pilot signal, the L channel signal and the R channel signal.

14. The stereo decoding system as claimed in claim 10, wherein the center frequency is an integer multiple of the frequency of the pilot signal.

15. The stereo decoding system as claimed in claim 10, wherein the pilot signal has a frequency of about 19 KHz.

16. The stereo decoding system as claimed in claim 10, wherein the PLL output signal has a frequency of about 38 KHz.

17. The stereo decoding system as claimed in claim 10, wherein the center frequency has a frequency of about 456 KHz.

18. An FM decoding chip, comprising:
   a FM demodulator, receiving and demodulating radio signals to generate stereo multiplexed signals; and
   a stereo decoding system as claimed in claim 1, separating left channel signals and right channel signals from the stereo multiplexed signal.

19. A FM decoding chip, comprising: a FM demodulator, receiving and demodulating the radio signals to generate stereo multiplexed signals; and a stereo decoding system as claimed in claim 10, separating left channel signals and right channel signals from the stereo multiplexed signals.

20. A stereo decoding method, comprising: receiving a stereo multiplexed signal;
   determining a first signal with a center frequency of a bandpass filter;
   filtering out a pilot signal from the stereo multiplexed signal by the bandpass filter according to the center frequency;
   providing a PLL unit to generating a PLL output signal based on the pilot signal; and
   providing a stereo decoder receiving the stereo multiplexed signal and the PLL output signal to separate a left channel signal and a right channel signal from the stereo multiplexed signal.

21. The stereo decoding method as claimed in claim 20, further comprising providing a calibration circuit to calibrate the PLL output signal and the first signal output from the PLL unit.

22. The stereo decoding method as claimed in claim 20, wherein the first signal is generated by an oscillator.

23. The stereo decoding method as claimed in claim 22, further comprising providing a calibration circuit to calibrate the oscillator to output the center frequency.

24. The stereo decoding method as claimed in claim 20, wherein the stereo multiplexed signal is received from a FM demodulator.

25. The stereo decoding method as claimed in claim 20, wherein the pilot signal has a frequency of about 19 KHz.

26. The stereo decoding method as claimed in claim 20, wherein the PLL output signal has a frequency of about 38 KHz.

27. The stereo decoding method as claimed in claim 20, wherein the center frequency has a frequency of about 456 KHz.

28. The stereo decoding method as claimed in claim 20, wherein the calibration circuit receives a reference signal having a tuning window and calibrates the center frequency according to number of clock cycles of the first signal in the tuning window.

* * * * *